US012674682B2

(12) United States Patent
Rohde et al.

(10) Patent No.: US 12,674,682 B2
(45) Date of Patent: Jul. 7, 2026

(54) METHOD AND SYSTEM FOR GENERATING A LOCALIZATION MAP CONTAINING AT LEAST ONE UNIQUE COMBINATION OF FEATURES

(71) Applicant: Robert Bosch GmbH, Stuttgart (DE)

(72) Inventors: Jan Rohde, Stuttgart (DE); Philipp Rasp, Reusten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 51 days.

(21) Appl. No.: 18/936,442

(22) Filed: Nov. 4, 2024

(65) Prior Publication Data

US 2025/0164277 A1 May 22, 2025

(30) Foreign Application Priority Data

Nov. 16, 2023 (DE) ..................... 10 2023 211 401.1

(51) Int. Cl.
*G01C 21/00* (2006.01)

(52) U.S. Cl.
CPC ..... *G01C 21/3841* (2020.08); *G01C 21/3815* (2020.08)

(58) Field of Classification Search
CPC ........ G08G 1/0969; G08G 1/048; G08G 1/20; G01C 21/3841; G01C 21/3815; G01C 21/3848

See application file for complete search history.

(56) References Cited

U.S. PATENT DOCUMENTS 11,176,703 B1 * 11/2021 Stumpf .................. G01C 21/30
2020/0110817 A1 * 4/2020 Viswanathan ........ G06F 16/215
(Continued)

FOREIGN PATENT DOCUMENTS

DE 102018008988 A1 5/2019
DE 102021003567 A1 8/2021
(Continued)

OTHER PUBLICATIONS

Hansch et al. "Comparison of 3D Interest Point Detectors and Descriptors for Point Cloud Fusion," ISPRS Annals of the Photogrammetry, Remote Sensing and Spatial Information Sciences, vol. II-3 (2014); pp. 57-64.

*Primary Examiner* — Tarek Elarabi
(74) *Attorney, Agent, or Firm* — NORTON ROSE FULBRIGHT US LLP

(57) ABSTRACT
A method for generating a localization map for operating an automated and/or assisting vehicle system of a vehicle. Fleet data are collected by traversing a traffic route portion with fleet vehicles. The localization map is generated from the collected fleet data. A unique combination of features is ascertained from the collected fleet data. Based on a result of a comparison of the unique combination of features with fleet data for each individual traversal of the traffic route portion or with a modeling of a sensor detection range of a non-fleet vehicle along the traffic route portion, it is ascertained whether the unique combination of features can be detected by a surrounding area sensor system of the fleet vehicles or the vehicle. The unique combination of features is stored in the preliminary localization map if the unique combination of features can be detected by the surrounding area sensor system.

8 Claims, 2 Drawing Sheets

(56)                     References Cited

U.S. PATENT DOCUMENTS

| 2021/0004363 | A1* | 1/2021 | Bailly | ...................... | G06T 17/05 |
| 2021/0074156 | A1* | 3/2021 | Brookins | ........... | G01C 21/3492 |
| 2021/0358167 | A1* | 11/2021 | Stumpf | ...................... | G06T 7/12 |
| 2025/0118095 | A1* | 4/2025 | Lin | ...................... | G06V 20/588 |

FOREIGN PATENT DOCUMENTS

| DE | 112018008077 | A1 | 9/2021 |
| DE | 102023101181 | A1 | 7/2023 |

* cited by examiner

METHOD AND SYSTEM FOR GENERATING A LOCALIZATION MAP CONTAINING AT LEAST ONE UNIQUE COMBINATION OF FEATURES

FIELD

The present invention relates to a method for generating a localization map, containing at least one unique combination of features, for operating an automated and/or assisting vehicle system of a vehicle, wherein fleet data are collected by traversing a traffic route portion, assigned to the localization map, with fleet vehicles of a vehicle fleet, the localization map is generated from the collected fleet data and at least one unique combination of features is ascertained from the collected fleet data. In addition, the present invention relates to a system for generating a localization map, containing at least one unique combination of features, for operating an automated and/or assisting vehicle system of a vehicle, having a plurality of fleet vehicles, each having at least one surrounding area sensor system; at least one central data processing unit, which can be connected to the fleet vehicles for collecting fleet data by traversing a traffic route portion, assigned to the localization map, with the fleet vehicles and which is configured to generate the localization map from the collected fleet data and to ascertain at least one unique combination of features from the collected fleet data.

BACKGROUND INFORMATION

A detection of a vehicle's surrounding area using an in-vehicle perception system based on a surrounding area sensor system, which may have a radar sensor and/or a video camera, for example, is a fundamental component of modern automated vehicle systems (AD systems) and assisting vehicle systems (DA systems). The surrounding area models used here are often supplemented by additional map information, such as lane courses. Map data used for this purpose, for example in the form of map products such as planning maps, behavior maps and/or localization maps, can be made available to the particular vehicle system via a map service.

A determination of a vehicle position relative to the map being used is a basis for using the map data. Feature-based localization, in particular self-localization, of the vehicle makes possible an estimation of a vehicle position and orientation relative to the map, wherein this estimation is based on a localization map and vehicle-side radar feature measurements. Ambiguities in a localization map in particular pose a challenge for current feature-based localization approaches.

Crowdsourcing of fleet data with the aim of creating maps is already available. For this purpose, fleet data for traffic route regions to be mapped and/or monitored are requested and transferred without making a targeted selection. In addition, a large number of algorithms are described in the related art for creating, expanding and updating localization maps. Furthermore, approaches are described in the related art with which locally unique combinations of features are identified in localization maps.

Germany Patent Application No. DE 10 2018 008 988 A1 relates to a method for updating map data used for navigating an autonomously operated motor vehicle. According to the method, a route portion in a surrounding area of the motor vehicle is detected by a surrounding area sensor system of the motor vehicle in that the surrounding area sensor system generates detection data that characterize the route portion. In addition, a deviation data set characterizing a difference between the detection data and the map data with respect to the route portion is ascertained if the detection data differ from the map data. Furthermore, the deviation data set is transmitted to an external calculation device. Furthermore, the map data are updated based on the deviation data set using the external calculation device.

SUMMARY

A subject of the present invention is a method for generating a localization map, containing at least one unique combination of features, for operating an automated and/or assisting vehicle system of a vehicle. The method can be used to improve the reliability of feature-based vehicle localization systems in that unique combinations of features are processed in a new way and stored in a localization map. In particular, according to an example embodiment, with the comparison according to the present invention of the particular unique combinations of features either with the fleet data for each individual traversal of the traffic route portion or with the modeling of the sensor detection range of the non-fleet vehicle along the traffic route portion, only those unique combinations of features are selected and stored in the localization map that can also be detected by the surrounding area sensor system of the fleet vehicle or the non-fleet vehicle. Only such detectable unique combinations of features can be used for localization. Thus, the vehicle's self-localization can then be carried out using unique combinations of features that can be reliably detected, which considerably improves the reliability and accuracy of this self-localization.

In contrast, conventional self-localization does not take into account the detectability of the particular unique combinations of features by the surrounding area sensor system of a vehicle.

According to the method according to an example embodiment of the present invention, the particular unique combination of features can be compared with the fleet data for each individual traversal of the traffic route portion so that it can be determined for each traversal whether or not the unique combination of features can be detected by means of the surrounding area sensor system of the fleet vehicle. With this alternative, it is assumed that the vehicles that provide the fleet data (fleet vehicles) are also the vehicles that use the localization map with at least one unique combination of features. Alternatively, the vehicles that use the localization map with the at least one unique combination of features can differ from the vehicles that provide the fleet data, in particular with regard to the sensor detection range of their particular surrounding area sensor system. In this case, the at least one unique combination of features is then compared with the modeling of the sensor detection range of the non-fleet vehicle along the traffic route portion, for example along a lane course of the traffic route portion. A simple model of the non-fleet vehicle can be used here, for example. This vehicle may be a vehicle of a vehicle fleet that is designed differently with regard to the particular sensor detection range, i.e., a vehicle fleet whose vehicles differ from the fleet vehicles that provide the fleet data with regard to the particular sensor detection range. Then, the result of the comparison of the at least one unique combination of features with the modeling of the sensor detection range of the non-fleet vehicle along the traffic route portion can be used to generate a localization map that is valid for all vehicles of the differently designed vehicle fleet.

According to the method according to an example embodiment of the present invention, the fleet data are initially collected by traversing a traffic route portion, assigned to the localization map, with fleet vehicles of a vehicle fleet. The traffic route portion is traversed with the particular fleet vehicle in order to be able to detect data about the surrounding area of the fleet vehicle by means of the surrounding area sensor system. The surrounding area sensor system may, for example, have at least one camera and/or at least one radar sensor and/or at least one LiDAR sensor. In particular, the fleet vehicles may have the same design with regard to their particular surrounding area sensor system. In addition, the fleet vehicles may also be designed to be substantially identical in construction in all other respects. The collected fleet data may be transferred to a cloud system, i.e., a fleet cloud, for example. For example, the map data may be transferred from the fleet cloud to a fleet data map creation cloud, where they can in particular be processed into the localization map in a conventional manner.

The at least one unique combination of features can then be ascertained from the fleet data, in particular the fleet data assigned to the localization map or the traffic route portion. This is described, for example, in the article "Comparison of 3D interest point detectors and descriptors for point cloud fusion," R. Hänsch et al, ISPRS Annals of the Photogrammetry, Remote Sensing and Spatial Information Sciences, 2014, volume II-3, pages 57-64 (isprs-annals.copernicus.org/articles/II-3/57/2014/).

The localization map which can be generated using the method according to the present invention and which contains the at least one unique combination of features can in particular be used for operating an automated vehicle system (AD system) and/or assisting vehicle system (DA system) of a vehicle.

According to an advantageous example embodiment of the present invention, on the basis of the result of the comparison, it is ascertained from which lane or lanes of the traffic route portion the unique combination of features can be detected by the surrounding area sensor system. Information from a lane data layer of the generated localization map can be used for this purpose. If the individual traversals of the traffic route portion have already been assigned to individual lanes to generate this localization map, this information is already available and can be used to ascertain from which lane or lanes of the traffic route portion the unique combination of features can be detected by the surrounding area sensor system.

According to a further advantageous example embodiment of the present invention, at least one quality value is ascertained for the unique combination of features using a detection rate, which is ascertained from the result of the comparison and specific to the unique combination of features, and/or a visibility of the unique combination of features, which visibility is ascertained from the result of the comparison, from at least two different regions of the traffic route portion and/or a currentness of the fleet data, and the quality value is stored in the localization map. The detection rate may, for example, indicate in percent or as a ratio in how many of the traversals of the traffic route portion the unique combination of features was actually detected by the fleet vehicles. The visibility of the unique combination of features may be given, for example, by the number of lanes from which the unique combination of features can be detected. The quality value is preferably continuous.

A further subject of the present invention is a system for generating a localization map, containing at least one unique combination of features, for operating an automated and/or assisting vehicle system of a vehicle. According to an example embodiment of the present invention, the system has a plurality of fleet vehicles, each having at least one surrounding area sensor system; at least one central data processing unit, which can be connected to the fleet vehicles for collecting fleet data by traversing a traffic route portion, assigned to the localization map, with the fleet vehicles and which is configured to generate the localization map from the collected fleet data and to ascertain at least one unique combination of features from the collected fleet data. The central data processing unit is configured to ascertain, on the basis of a result of a comparison of the unique combination of features either with fleet data for each individual traversal of the traffic route portion or with a modeling of a sensor detection range of a non-fleet vehicle along the traffic route portion, whether or not the unique combination of features can be detected by the surrounding area sensor system of the fleet vehicles or the vehicle, and to store the unique combination of features in the preliminary localization map if the unique combination of features can be detected by the surrounding area sensor system.

The advantages mentioned above with reference to the method of the present invention are correspondingly associated with the system of the present invention. Advantageous embodiments of the method of the present invention may correspond to advantageous embodiments of the system of the present invention. The central data processing unit may be cloud-based, for example.

According to an advantageous example embodiment of the present invention, the central data processing unit is configured to ascertain, on the basis of the result of the comparison, from which lane or lanes of the traffic route portion the unique combination of features can be detected by the surrounding area sensor system. The advantages mentioned above with reference to the corresponding embodiment of the method are correspondingly associated with this embodiment.

According to a further advantageous example embodiment of the present invention, the central data processing unit is configured to ascertain at least one quality value for the unique combination of features using a detection rate, which is ascertained from the result of the comparison and specific to the unique combination of features, and/or a visibility of the unique combination of features, which visibility is ascertained from the result of the comparison, from at least two different regions of the traffic route portion and/or a currentness of the fleet data and to store the quality value in the localization map. The advantages mentioned above with reference to the corresponding embodiment of the method are correspondingly associated with this embodiment.

According to a further advantageous example embodiment of the present invention, the central data processing unit is configured to generate a separate detection query for each unique combination of features and to send it to the fleet vehicles in order to preferably or exclusively detect the particular unique combination of features by means of the surrounding area sensor system of the particular fleet vehicle during a traversal of the traffic route portion. The detection queries, also known as job requests, can be used to specifically request the detecting of unique combinations of features. As a result, a high degree of currentness and accuracy, in particular through the significance of the feature statistics, of the unique combinations of features can be ensured while keeping the data rate low. Efficient crowdsourcing of unique combinations of features is thus possible.

According to a further advantageous example embodiment of the present invention, the central data processing unit is configured to ascertain, for the operation of the automated and/or assisting vehicle system, a route and trajectory planning with which unique combinations of features can be detected. As a result, it can be ensured that the particular unique combination of features can be reliably detected by the surrounding area sensor system, in particular to make precise self-localization possible.

According to a further advantageous example embodiment of the present invention, the automated and/or assisting vehicle system of at least one fleet vehicle or at least one non-fleet vehicle of the system is configured to perform a self-localization using the localization map containing the at least one unique combination of features, and, in doing so, to take into account only those unique combinations of features whose quality value stored in the localization map is above a predefined lower limit value. The vehicle system can thus use the quality value to ensure a minimum quality of unique combinations of features for a given use case, for example initialization of a self-localization. The quality value can thus be taken into account when activating or initializing the self-localization so that, for example, only high-quality unique combinations of features can be used with applications with high error rate requirements. This makes it possible to further increase the efficiency and reliability of the self-localization. As a result, the system can be used as part of a security concept for a feature-based vehicle self-localization.

In the following, the present invention is explained by way of example with reference to the figures based on preferred example embodiments, wherein the features explained below can represent an advantageous and/or developing aspect of the present invention both individually and in different combinations of at least two of these features with one another.

DETAILED DESCRIPTION OF EXAMPLE EMBODIMENTS

In the figures, the same or functionally identical components are provided with the same reference signs. A repeated description of such components may be omitted in order to avoid unnecessary repetition.

Figure 1:
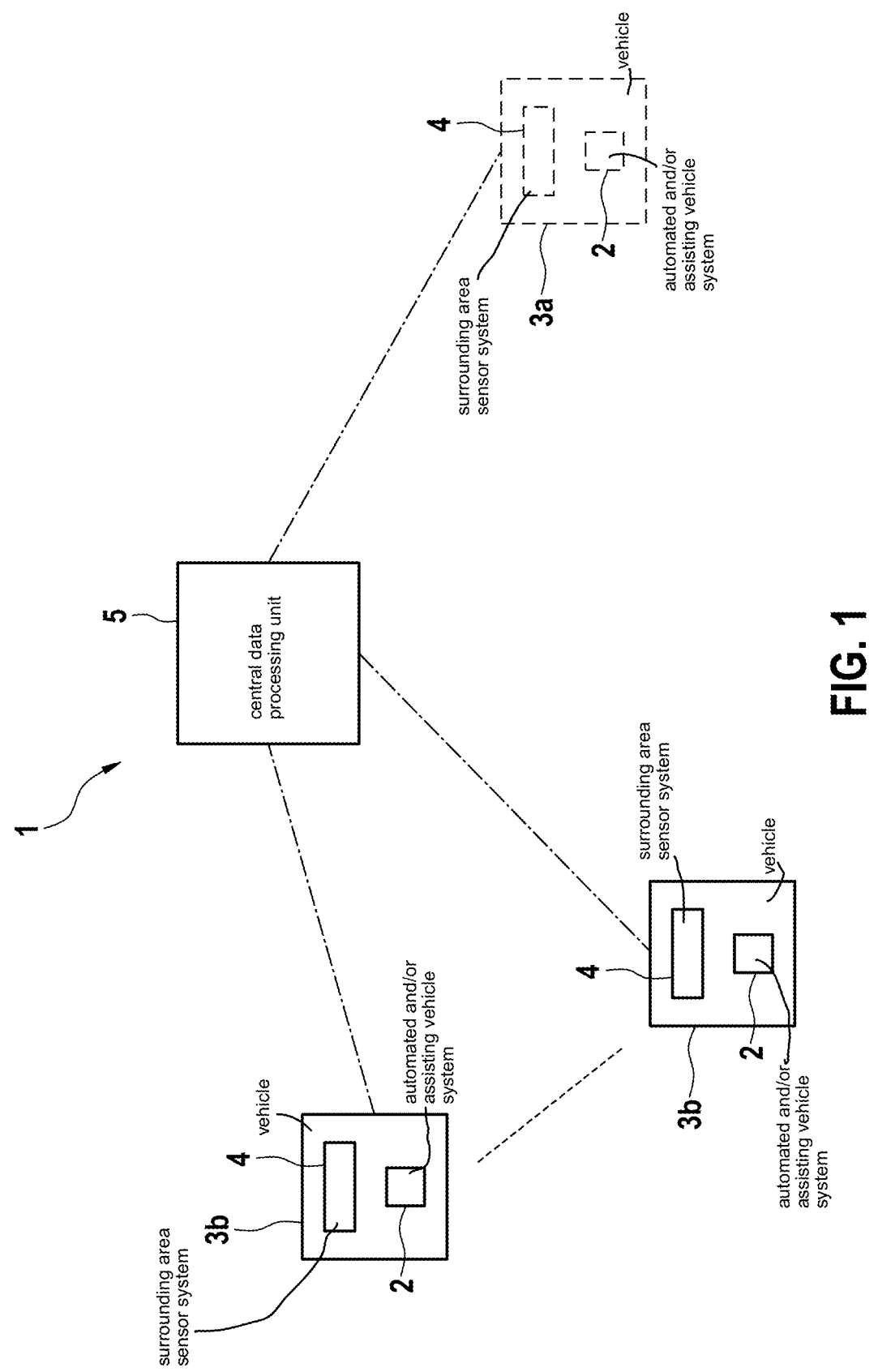
FIG. 1 is a schematic representation of an exemplary embodiment of a system according to the present invention.

FIG. 1 is a schematic representation of an exemplary embodiment of a system 1 according to the present invention for generating a localization map, containing at least one unique combination of features, for operating an automated and/or assisting vehicle system 2 of a vehicle 3a or 3b.

The system 1 has a large number of fleet vehicles 3b, each having at least one surrounding area sensor system 4. In addition, the system 1 has a central data processing unit 5, which can be connected to the fleet vehicles 3b for collecting fleet data by traversing a traffic route portion, assigned to the localization map, with the fleet vehicles 3b. The central data processing unit 5 is configured to generate the localization map from the collected fleet data and to ascertain at least one unique combination of features from the collected fleet data.

The central data processing unit 5 is also configured to ascertain, on the basis of a result of a comparison of the unique combination of features either with fleet data for each individual traversal of the traffic route portion or with a modeling of a sensor detection range of a non-fleet vehicle 3a along the traffic route portion, whether or not the unique combination of features can be detected by the surrounding area sensor system 4 of the fleet vehicles 3b or the vehicle 3a, and to store the unique combination of features in the preliminary localization map if the unique combination of features can be detected by the surrounding area sensor system 4.

Furthermore, the central data processing unit 5 is configured to ascertain, on the basis of the result of the comparison, from which lane or lanes of the traffic route portion the unique combination of features can be detected by the surrounding area sensor system 4.

In addition, the central data processing unit 5 is configured to ascertain at least one quality value for the unique combination of features using a detection rate, which is ascertained from the result of the comparison and specific to the unique combination of features, and/or a visibility of the unique combination of features, which visibility is ascertained from the result of the comparison, from at least two different regions of the traffic route portion and/or a currentness of the fleet data and to store the quality value in the localization map. The automated and/or assisting vehicle system 2 of at least one fleet vehicle 3b or at least one non-fleet vehicle 3a of the system 1 is configured to perform a self-localization using the localization map containing the at least one unique combination of features, and, in doing so, to take into account only those unique combinations of features whose quality value stored in the localization map is above a predefined lower limit value.

In addition, the central data processing unit 5 is configured to generate a separate detection query for each unique combination of features and to send it to the fleet vehicles 3b in order to preferably or exclusively detect the particular unique combination of features by means of the surrounding area sensor system 4 of the particular fleet vehicle 3b during a traversal of the traffic route portion.

Furthermore, the central data processing unit 5 may be configured to ascertain, for the operation of the automated and/or assisting vehicle system 2, a route and trajectory planning with which unique combinations of features can be detected.

Figure 2:
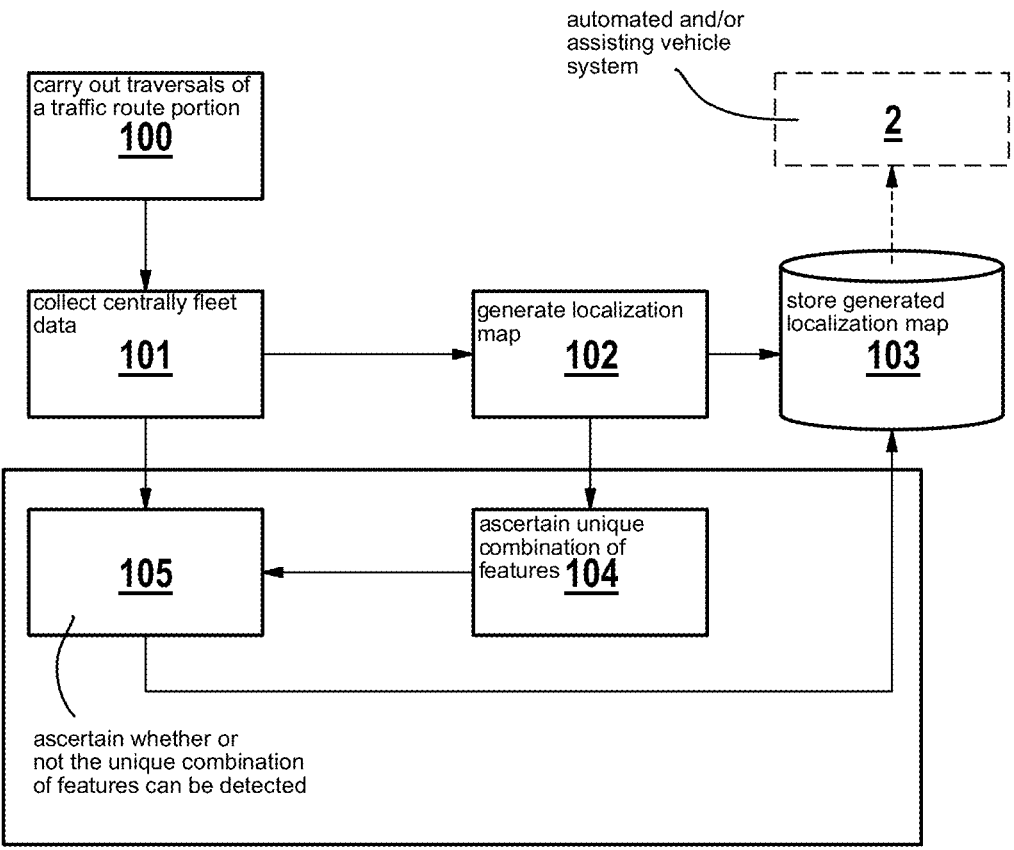
FIG. 2 is a flow chart of an exemplary embodiment of a method according to the present invention.

FIG. 2 is a flow chart of an exemplary embodiment of a method according to the present invention for generating a localization map, containing at least one unique combination of features, for operating an automated and/or assisting vehicle system 2 of a vehicle (not shown).

In method step 100, traversals of a traffic route portion assigned to the localization map are carried out with fleet vehicles of a vehicle fleet, during which the traffic route portion is detected by means of the surrounding area sensor system of the particular fleet vehicle. As a result, fleet data assigned to the traffic route portion are generated in method step 100. The fleet data generated in method step 100 are collected centrally in method step 101.

In method step 102, the localization map is generated from the collected fleet data and is stored in method step 103. In method step 104, at least one unique combination of features is ascertained from the collected fleet data.

In method step 105, on the basis of a result of a comparison of the unique combination of features either with collected fleet data for each individual traversal of the traffic route portion or with a modeling of a sensor detection range of a non-fleet vehicle along the traffic route portion, it is ascertained whether or not the unique combination of features can be detected by a surrounding area sensor system of the fleet vehicles or the vehicle, wherein the unique combination of features is stored in the preliminary localization map if the unique combination of features can be detected by the surrounding area sensor system.

Furthermore, in method step 105, on the basis of the result of the comparison, it can be ascertained from which lane or lanes of the traffic route portion the unique combination of features can be detected by the surrounding area sensor system.

Furthermore, in method step 105, at least one quality value is ascertained for the unique combination of features using a detection rate, which is ascertained from the result of the comparison and specific to the unique combination of features, and/or a visibility of the unique combination of features, which visibility is ascertained from the result of the comparison, from at least two different regions of the traffic route portion and/or a currentness of the fleet data. The quality value is stored in the localization map in method step 103.

The invention claimed is:

1. A method for generating a localization map, containing at least one unique combination of features, for operating an automated and/or assisting vehicle system of a vehicle, the method comprising the following steps:

collecting fleet data by traversing a traffic route portion, assigned to the localization map, using fleet vehicles of a vehicle fleet;

generating the localization map from the collected fleet data;

ascertaining a unique combination of features from the collected fleet data;

ascertaining, based on a result of a comparison of the unique combination of features either with fleet data for each individual traversal of the traffic route portion or with a modeling of a sensor detection range of a non-fleet vehicle along the traffic route portion, whether or not the unique combination of features can be detected by a surrounding area sensor system of the fleet vehicles or the non-fleet vehicle; and storing the unique combination of features in the localization map when the unique combination of features can be detected by the surrounding area sensor system;

ascertaining at least one quality value for the unique combination of features;

storing the quality value in the localization map; and performing a self-localization, by an automated and/or assisting vehicle system of at least one of the fleet vehicles or at least one non-fleet vehicle, using the localization map containing the at least one unique combination of features whose quality value stored in the localization map is above a predefined lower limit value.

2. The method according to claim 1, further comprising:

ascertaining, based on the result of the comparison, from which lane or lanes of the traffic route portion the unique combination of features can be detected by the surrounding area sensor system.

3. The method according to claim 1, wherein the quality value for the unique combination of features is ascertained using: (i) a detection rate, which is ascertained from the result of the comparison and specific to the unique combination of features, and/or (ii) a visibility of the unique combination of features, which visibility is ascertained from the result of the comparison, from at least two different regions of the traffic route portion, and/or (iii) a currentness of the fleet data.

4. A system for generating a localization map, containing at least one unique combination of features, for operating an automated and/or assisting vehicle system of a vehicle, comprising:

a plurality of fleet vehicles, each having at least one surrounding area sensor system;

at least one central data processing unit, which can be connected to the fleet vehicles for collecting fleet data obtained by traversing a traffic route portion, assigned to the localization map, with the fleet vehicles, and the central data processing unit being configured to generate the localization map from the collected fleet data and to ascertain a unique combination of features from the collected fleet data, wherein the central data processing unit is configured to ascertain, based on a result of a comparison of the unique combination of features either with fleet data for each individual traversal of the traffic route portion or with a modeling of a sensor detection range of a non-fleet vehicle along the traffic route portion, whether or not the unique combination of features can be detected by the surrounding area sensor system of the fleet vehicles or the bon- or the non-fleet, to store the unique combination of features in the localization map if the unique combination of features can be detected by the surrounding area sensor system, to ascertain at least one quality value for the unique combination of features, and to store the quality value in the localization map;

wherein an automated and/or assisting vehicle system of at least one of the fleet vehicles or at least one non-fleet vehicle performs a self-localization using the localization map containing the at least one unique combination of features whose quality va lue stored in the localization map is above a predefined lower limit value.

5. The system according to claim 4, wherein the central data processing unit is configured to ascertain, on the basis of the result of the comparison, from which lane or lanes of the traffic route portion the unique combination of features can be detected by the surrounding area sensor system.

6. The system according to claim 4, wherein the quality value for the unique combination of features is ascertained using:

(i) a detection rate, which is ascertained from the result of the comparison and specific to the unique combination of features, and/or (ii) a visibility of the unique combination of features, which visibility is ascertained from the result of the comparison, from at least two different regions of the traffic route portion, and/or (iii) a currentness of the fleet data.

7. The system according to claim 4, wherein the central data processing unit is configured to generate a separate detection query for each unique combination of features and to send the separate detection query to the fleet vehicles in order to detect the unique combination of features using the surrounding area sensor system of each fleet vehicle during a traversal of the traffic route portion.

8. The system according to claim 4, wherein the central data processing unit is configured to ascertain, for the operation of the automated and/or assisting vehicle system, a route and trajectory planning with which unique combinations of features can be detected.

* * * * *